Dec. 22, 1959  A. M. LIPPISCH  2,918,233
AERODYNE WITH EXTERNAL FLOW
Filed Oct. 22, 1956  5 Sheets-Sheet 1

INVENTOR.
ALEXANDER M. LIPPISCH
BY
ATTORNEY

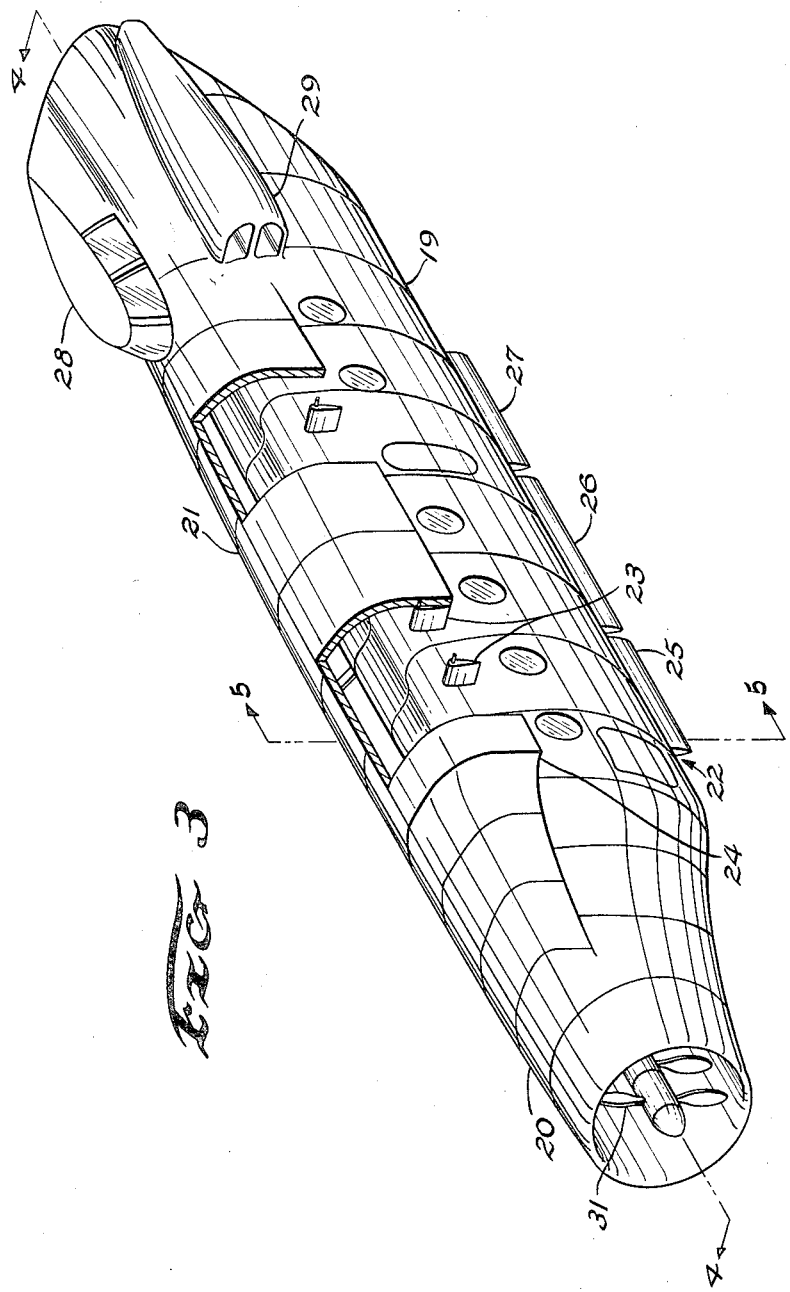

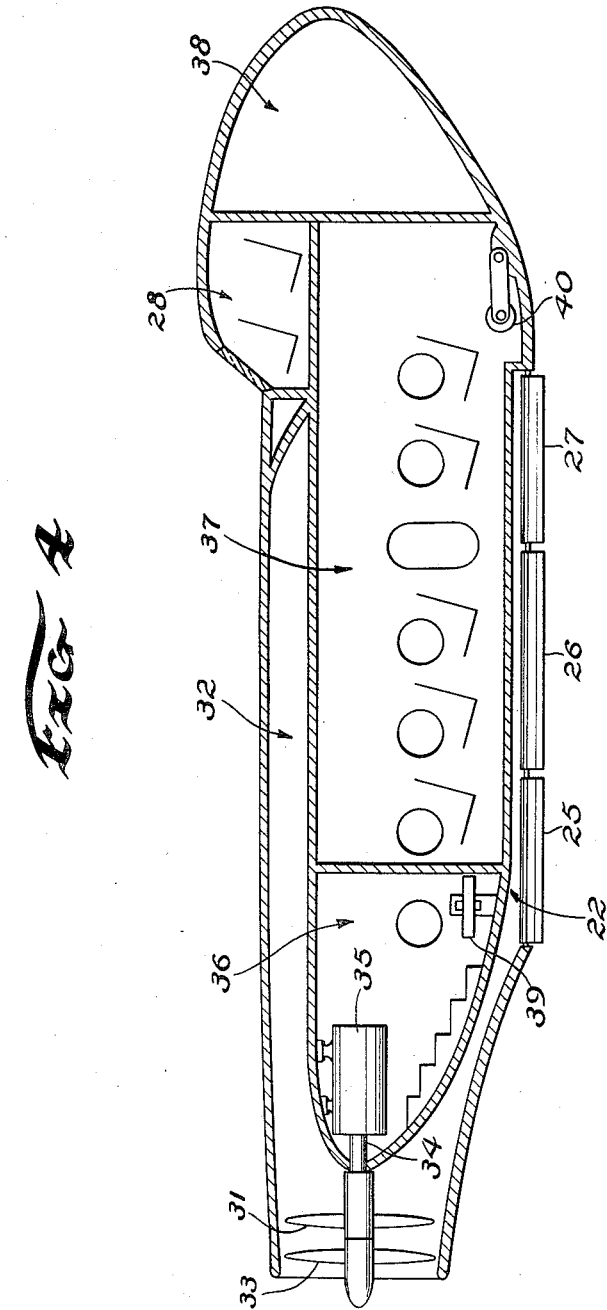

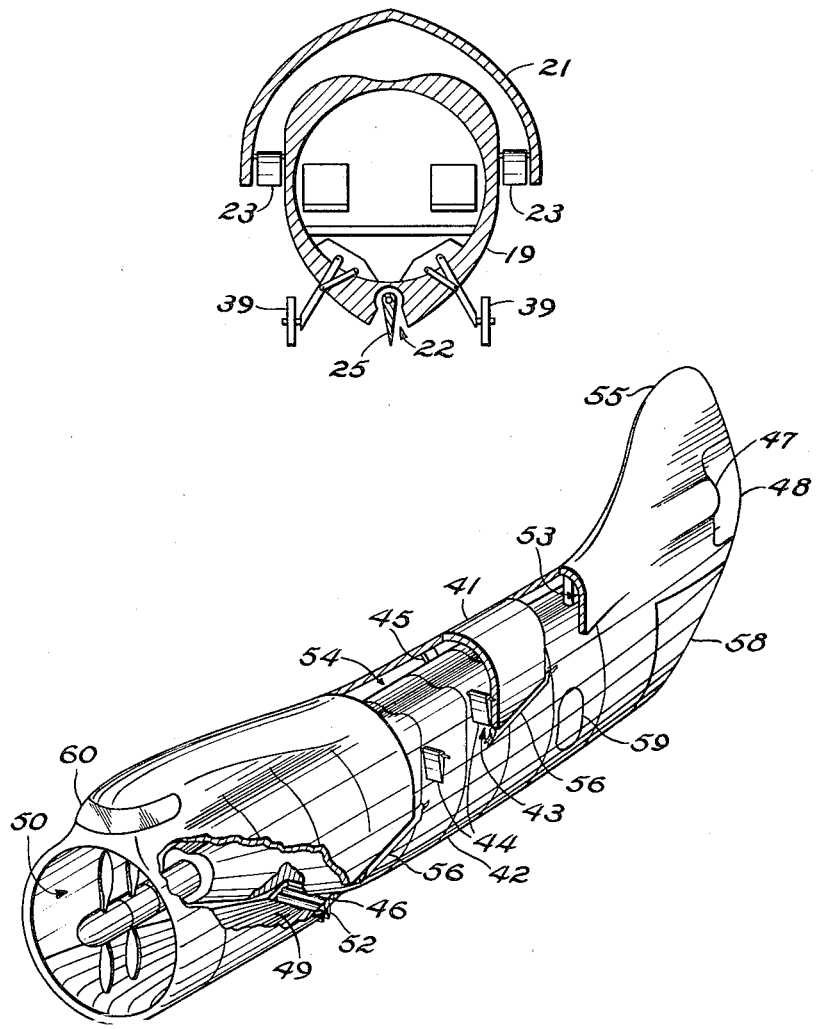

United States Patent Office 2,918,233
Patented Dec. 22, 1959

2,918,233

AERODYNE WITH EXTERNAL FLOW

Alexander M. Lippisch, Cedar Rapids, Iowa, assignor to Collins Radio Company, Cedar Rapids, Iowa, a corporation of Iowa Application October 22, 1956, Serial No. 617,650

2 Claims. (Cl. 244—23)

This invention pertains to wingless heavier-than-air aircraft, or aerodynes, that have propellers within air ducts, and particularly to aerodynes in which air flow is directed downward along the outside surfaces thereof.

Aircraft utilizing the air-flow system of this invention are particularly suitable for transporting passengers and cargo between points where long runways are unavailable. They are particularly useful in this service because they can hover, ascend or descend vertically, or fly forward at a high speed.

Helicopters that have large blades attached to vertical shafts have been used extensively between points having limited runways. Helicopters are inherently complicated, inefficient, slow, and require large parking areas. The advantages of simplicity, efficient operation, and high rate of speed of aircraft having air ducts over helicopters have been described in co-pending application for U.S. patent, "Ducted Propeller Aircraft," filed by Alexander M. Lippisch.

An object of the present invention is to provide wingless aircraft which utilize the principle that air flow downward about a streamlined body induces lifting forces.

Another object is to provide aircraft of simple design that can hover, ascend or descend vertically, or fly forward at a high rate of speed.

And still another is to increase the efficiency of aircraft by use of shrouded propellers.

And another object is to increase the efficiency of aircraft by propelling air over the sides so as to reduce drag caused by slowly moving boundary layers of air along the outside surfaces thereof.

A feature of the aircraft of this invention is the convenient placement of cargo space low in the aircraft so that loading may be accomplished directly from the ground.

Another feature is the placement of passenger compartments so the view from the sides is completely unrestricted.

The description of aircraft using external flow and the appended claims will be more readily understood with reference to the accompanying figures, in which:

Figure 3 shows a front oblique view of a passenger aircraft, or aerodyne, with portions of a top shield being cut away to show the air-flow system of this invention;

Figure 4 is a longitudinal cross-sectional view showing the air-flow system and the interior arrangement of the aircraft shown in Figure 3;

Figure 5 is a cross-sectional view on plane 5—5 across the fuselage of the aircraft shown in Figure 3;

Figure 6 is a front oblique view of a cargo carrier or troop-carrying aircraft having cut-away portions for clearly showing the air-flow system according to this invention;

In general, an aircraft constructed according to this invention consists of an elongated body combined with an air-flow system for producing external flow over outside surfaces. In the aircraft shown in Figure 3, the air-flow system consists of an air duct with a cylindrical frontal section that divides as it extends rearward into an upper branch and a smaller lower branch. The upper branch consists of a shell spaced above an indentation that extends longitudinaly along the top of the main body. The lower branch extends along the bottom or apex of the main body.

Counter-rotating propellers mounted in the forward portion of the air duct system bring air into a front intake opening and apply air under high pressure to the upper and lower branches of the air duct. Air is expelled from each side of the upper branch through a long rectangular opening that exists between the upper shell and the main body. The stream of air flows downward along the sides of the body or fuselage and is mixed with large quantities of outer air. The convex sides of the aircraft are inclined inward to provide a streamlined surface over which the air flows toward a lower apex. In order to maintain the air flow close to the sides of the fuselage, additional force is provided by expelling air from a lower opening that extends along the bottom of the lower branch of the air duct.

Lift is applied to the aircraft because of differences in air pressure existing between top and bottom portions of the fuselage. Because of the high velocity of the air expelled from the upper openings, relatively low pressure exists at the broad upper portion of the fuselage. As the expelled air flows downward over the fuselage, large volumes of outer air are combined with the downward flow so that the total mass of downward flow is greatly increased. The greater mass caused by the mixing of outer air with the expelled air stream produces more pressure on the lower portion of the sides than that which is produced on the upper portions that are near the upper exhaust openings. The sum of the forces is directed upward and provides lift for the aircraft.

For forward flight, thrust is provided in addition to lift by directing the air-flow slantingly rearward. Deflecting vanes are mounted in each of the openings for directing flow as required.

The air-flow system of Figure 6 has been modified for application to aircraft that may be used for carrying either freight or troops. The side exhaust openings slant upward toward the rear; a bottom exhaust opening is provided for additional thrust and lift; and rear exhaust openings provide air flow over the rudder.

Figure 1:
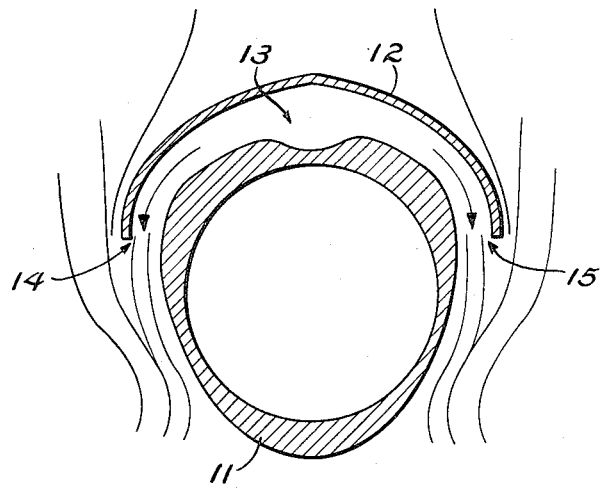
Figure 1 shows a cross-sectional view of a typical streamlined body and associated air-flow system.

The principle of an external flow system is shown in the cross-sectional view of Figure 1. A main body or fuselage 11 is combined with an upper downwardly curved surface or shell 12 to form an air-flow system. The relatively broad upper surface of the main body has a centrally disposed indentation which is used in conjunction with the upper shell to form an upper branch of the air-flow system. The side walls are smooth, convex surfaces that are inclined inward toward the bottom to form a lower apex. The sides are, therefore, streamlined for a downward flow of air. A downwardly curved surface 12 is rigidly spaced above the main body for forming a main central air duct 13 and side exhaust openings 14 and 15. When compressed air is applied to the central air duct 13, air is expelled at high velocity from exhaust openings 14 and 15 and flows downward along the streamlined sides of the main body. Outward air mixes with the downward air flow and lift is provided to the body as previously described.

Figure 2:
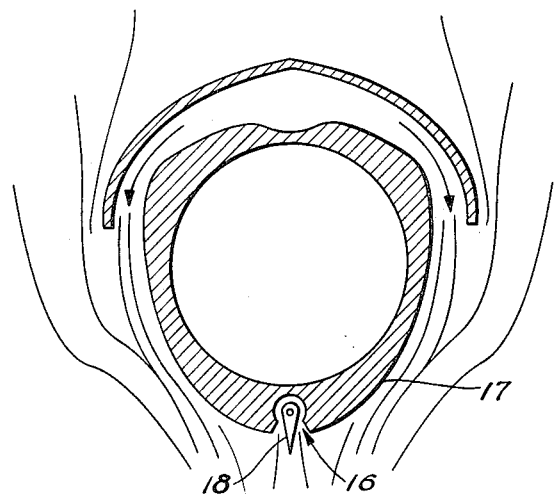
Figure 2 is a cross-sectional view of an air-flow system similar to that shown in Figure 1 modified to include an exhaust opening and control surfaces at the apex which is at the bottom of the body.

Figure 2 is similar to Figure 1 except that a lower exhaust opening 16 is shown at the apex of the streamlined body 17. When a lower opening is not provided in addition to the upper side openings and the body is quite large, the downward air stream diverges as it flows over the body and becomes ineffective in exerting upward force. Sufficient air is expelled from opening 16 to lower the air pressure as required to prevent a divergence of air as it flows from the side opening toward the apex at the bottom of the main body. Deflecting vane 18 is rotatably mounted in the bottom opening to aid in the control of the aircraft.

A passenger aircraft utilizing the air-flow system of this invention is shown in Figure 3. This aircraft consists of a streamlined elongated main body 19 and a downwardly curved surface or shell 21 arranged to form: an air-flow system including a frontal portion 20, an upper or main branch directly below curved surface 21, and a lower or secondary branch 22 disposed along the bottom of the main body. The upper branch of the air duct has an opening 24 underneath the edge at each side of curved surface 21 for propelling air downward over the sides of the fuselage 19. The sides of the aircraft and the lower portion of the shell near the openings are straight to provide just inside the openings parallel sides that are suitable for a plurality of rotatable vanes 23 that direct air as required for different modes of flight. Other control surfaces include three independently rotatable flaps 25, 26, and 27, disposed longitudinally within the opening of the lower branch 22 of the air duct. A cockpit 28 for the crew of the aircraft is located in the upper part of the tail section. In order to obtain increased forward thrust required for high speed, jet engine assemblies 29 are mounted on each side of the tail of the aircraft.

The arrangement of the air duct and of the passenger compartment is shown clearly in the longitudinal cross-sectional view of Figure 4. Counter-rotating propellers 31, which are mounted within the fore part of the air duct, supply compressed air to the upper branch 32 of the air duct and to lower branch 22. Air is drawn in through intake opening 33 which faces frontward and is expelled from side openings 24 which are shown in Figure 3 and from the bottom opening 22 which is shown clearly in the cross-sectional view in Figure 5. The propellers 31 of Figure 4 are drivingly coupled through shaft 34 to engine 35. Usually, for dependability, multiple engines are used. Provisions may be made for disconnecting a defective engine and repairing it in flight. Access of the engines is readily provided within engine room 36 which is situated in the fore part of the fuselage. Passenger compartment 37 is located behind the engine room between the two rear portions of the air-flow system. Since no parts of the plane project beyond the fuselage, passengers have unrestricted view from the windows. In the tail portion aft of the cockpit 28 is space 38 that may be used for electronic control equipment.

The cross-sectional view of the body of Figure 5 shows the mounting position of air-deflecting flap 25 that is located within the lower exhaust opening of the lower branch 22. The flap may be rotated to different positions for deflecting air straight downward to the left or to the right. Obviously, the aircraft tends to take a direction opposite to the direction of flow of the air stream.

The undercarriage may be arranged according to usual practice. For example, two main wheels may be placed ahead of the center of gravity and a tail wheel at the rear of the aircraft. The main wheels 39 are preferably retractable and during flight may be positioned horizontally above the lower branch of the air duct as shown in Figure 4. Also, tail wheel 40 of conventional design may be retracted as shown.

The control surfaces of this aircraft may be operated by usual control means. Preferably, electronic control systems are used to assist in accurately controlling flight. The vanes associated with the upper branch of the air duct may be rotated by pilot controls for positioning them vertically or at an angle as required. Preferably, the air-deflecting control surfaces in the opening of the lower branch of the air duct consist of three air-deflecting flaps 25, 26, and 27. The vanes are individually rotatable on their longitudinal axes.

During take-off, the upper air-deflecting vanes 23 are positioned for directing a main air stream downward so as to provide lift. When propellers 31 are rotated at the required speed, the aircraft rises vertically. While the plane is rising, the flaps in the bottom exhaust opening are positioned as required for maintaining stable horizontal attitude of the aircraft. After the desired altitude has been attained, the vanes are operated for directing the air stream rearward as well as downward over the surface of the aircraft. The forward thrust from the rearwardly directed air stream produces forward flight. Additional thrust for high speed flight may be supplied by jet engines mounted in the tail of the aircraft. The course of the aircraft is changed by changing the positions of air-deflecting flaps 25, 26, and 27, that are disposed at the bottom exhaust opening. The yaw of the aircraft is mainly controlled by positioning front air-deflecting flap 25 and rear air-deflecting flap 27 in opposite directions. The center air-deflecting vane or roll flap 26 is positioned as required for obtaining the desired amount of roll. When the aircraft is to be landed, the upper air-deflecting vanes are again turned for directing the air directly downward over the aircraft body and the speed of the propellers is reduced as required for slow vertical descent.

A modification of the air-flow system of this invention for application to aircraft suitable for carrying troops or cargo is shown in Figure 6. This aircraft differs from the passenger aircraft shown in Figure 3 in that the front portion of the outer arcuate shell of the air-flow system covers much of the fore part of the fuselage 42 but decreases in size toward the rear so as to cover a much smaller portion near the tail of the aircraft. Through this arrangement, each of the side exhaust openings 43 slant upward from the lower front toward the upper rear of the aircraft. The upper shell 41, like that of the aircraft shown in Figure 3, has an arcuate top portion and near the exhaust openings straight side portions for accommodating rotatable air-deflecting vanes 44. The vanes are spaced along the length of the exhaust openings and are rotatably mounted thereacross. Conventional control means may be used for positioning the vanes as required for directing air-flow slantingly downward either toward the front or toward the rear of the aircraft. The upper shell is rigidly fastened to the fuselage by placement of supporting members 45 between the fuselage and upper shell. These members may be located at each side of the central main air channel so that their length is kept to a minimum.

In addition to the two main side exhaust openings, exhaust opening 46 is located in the bottom of the aircraft just ahead of the main fuselage, and exhaust openings 47 are located for expelling air over each side of rudder 48. The bottom exhaust opening faces downward and rearward and communicates through the lower frontal portion 49 of the air duct to frontal intake opening 50. The upper and lower walls of duct 49, which is disposed between the lower frontal portion of the main fuselage 42 and the bottom portion of the main intake, are streamlined for directing air flow downward and rearward as required for usual forward flight. Air-deflecting vanes 52 are rotatably mounted across the exhaust opening 46 and are controllable for directing air flow downward for hovering or for vertical flight. Each of the rear exhaust openings 47 in front of the rudder communicates with the upper main branch 54 of the air-flow system through a longitudinal air duct 53, which is disposed between the tail fin 55 and the outer skin of the aircraft.

Figure 8:
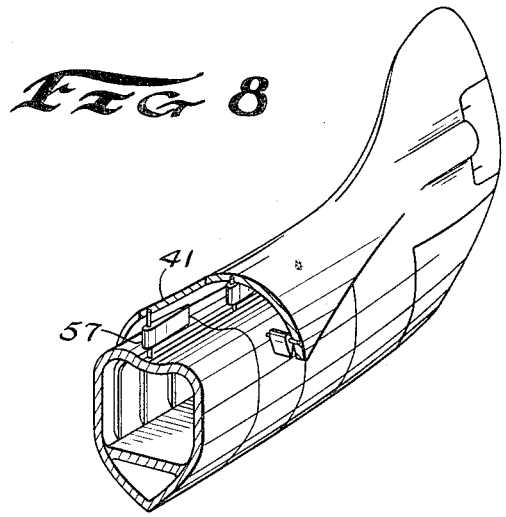
Figure 8 is a cut-away sectional view of the tail of the aircraft of Figure 6 for showing roll control means.

Control surfaces are incorporated for producing a different rate of flow of air from each of the side exhaust openings. For example, as shown in Figure 6, a roll flap 56 is rotatably mounted contiguous to the outer edge of each side exhaust opening. Conventional control means are associated with the flaps for individually rotating them inward for restricting air flow from a respective exhaust opening. Obviously, as air flow is restricted on one side, lift for that side of the aircraft is decreased. Another example of control means for changing the relative flow of air from the side exhaust openings is shown in Figure 8. Roll air-deflecting vanes 57 are mounted on vertical axes which extend upward from the center of the main air duct to the upper shell 41. A plurality of such vanes may be spaced throughout the length of the air duct and may be rotated by conventional control means for directing a greater flow of air over one side of the fuselage than over the other.

Figure 7:
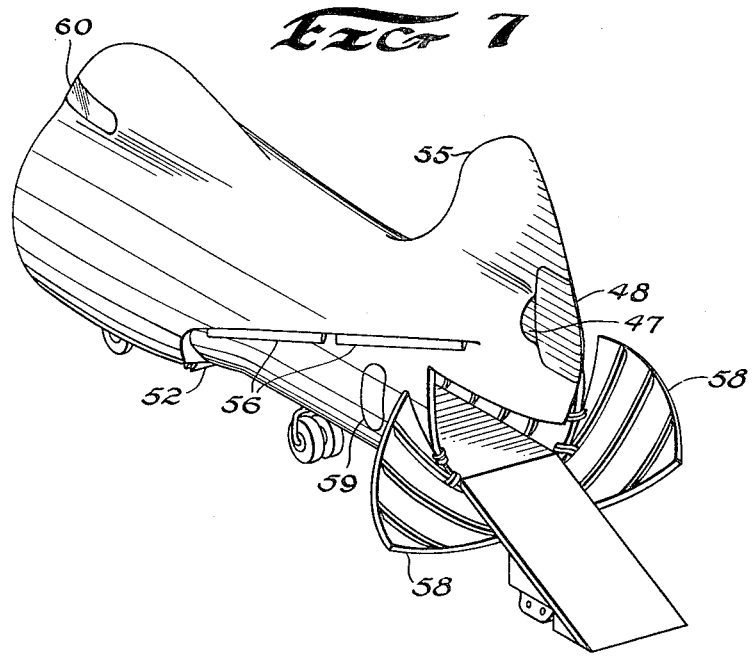
Figure 7 is a rear oblique view of the aircraft of Figure 6 showing doors for access to cargo space.

The arrangement of the air-flow system of this aircraft provides ready access to cargo space. Large doors 58, shown in Figures 6 and 7, are located to the rear of the fuselage and during loading are so near the ground that only a short inclined ramp is required for loading troops or vehicles. A smaller side door 59, shown in Figure 6, may be conveniently located for use by aircraft crew. Cockpit 60 is located above the frontal portion of the air-flow system.

In operation the deflecting vanes of the side exhaust openings of the aircraft shown in Figure 6 are operable to different positions as described for the aircraft of Figure 3. However, operation of the auxiliary controls modifies the effect of the positioning of the side vanes. For vertical flight or for hovering, both the deflecting vanes 44 in the side exhaust openings 43 and deflecting vanes 52 in the bottom exhaust opening 46 are positioned for directing the flow of air nearly straight downward. However, for this aircraft, the flow from these side outlets will need to be directed slightly forward to compensate for thrust obtained from rear exhaust openings 47. Since the flow of air is expelled from rear exhaust openings 47 at all times during operation of the aircraft, the rudder is effective in rotating the aircraft even though it is hovering. Forward flight is obtained by positioning air-deflecting vanes 44 and 52 rearward as well as downward. Roll is determined by controlling the relative rates of air-flow from side exhaust openings 43. For example, one of the flaps 56, which is contiguous with the side exhaust openings, may be turned inward to restrict air flow over the corresponding side of the fuselage, or the alternate control means shown in Figure 8 may be operated to direct a greater flow of air over one side than over the other. Obviously, the side of the aircraft having the greater flow of air will tend to rise with respect to the other side and cause the aircraft to roll. During a turn, either one of these roll control means is used in conjunction with rudder 48 and air-deflecting vanes 44 which are associated with the side exhaust openings. During forward flight, the rudder is used as usual to apply yawing force to the aircraft, and additional yawing force may be applied by positioning deflecting vanes 44 on one side of the aircraft for obtaining greater forward thrust than is obtained on the opposite side. While the aircraft is hovering or is in vertical flight, it may be rotated on its vertical axis without appreciable horizontal translatory motion by operating the deflecting vanes on one side of the aircraft slightly forward and by operating deflecting vanes on the opposite side of the aircraft slightly rearward.

Aircraft according to this invention operate efficiently and provide desirable conveniences not obtainable in prior aircraft. Its extreme maneuverability greatly aids in solving the growing problem of using aircraft where landing space is limited and where heavy traffic requires slow and orderly landings and take-offs.

The air-flow system may be adapted for use with aircraft ranging in size from small personal aircraft to large passenger aircraft and cargo carriers. Arrangement of the fuselage permits passengers and cargo to be loaded directly from the ground. In passenger aircraft, view from the sides is unrestricted for no structure projects beyond the fuselage.

Aircraft utilizing external air flow operate at high efficiency and are capable of attaining high speed. The relatively small frontal profile of the elongated streamlined body offers a minimum of drag. Also, the external flow of air over the fuselage minimizes that drag which usually exists because of a relatively stationary boundary layer of air adjacent the outer surfaces of conventional aircraft. High speed may be obtained by using jet engines. In supersonic flight, air that is to be expelled over the fuselage may be refrigerated to provide a relatively cool air shield that will prevent destructive heating of the aircraft structure. Efficiency of the aircraft is increased substantially by placing propellers in shrouds rather than placing them in open space in the manner used in prior aircraft. However, jet devices or other air-propelling means may be substituted for the counterrotating propellers that are included in the embodiments shown herein.

Although the external flow system of this invention has been described with respect to particular embodiments, it is to be understood that this system may be modified and applied to aircraft of various sizes for various services and still be within the spirit and scope of the following claims.

What is claimed is:

1. A wingless heavier-than-air aircraft having a streamlined elongated fuselage with an external air-flow system, said aircraft adapted to fly with the longitudinal axis of said fuselage being horizontal, said fuselage in lateral cross section being shaped substantially like a heart with a relatively broad upper portion having a central indentation and downwardly streamlined convex sides that are inclined to a central lower apex, an elongated concave upper shell mounted in a spaced relation to the upper indented portion of said fuselage, the indented portion of said fuselage and said shell forming an upper branch of said air-flow system extending fore to aft of said aircraft, a substantially cylindrical shell surrounding the fore part of said fuselage and extending forward to form a frontal air duct having an opening facing forward, said frontal air duct communicating with said upper branch, each of the lower edges of said upper shell extending in a spaced relation with the adjacent side of said fuselage to form an elongated downwardly facing exhaust opening extending substantially the full length of said fuselage, a lower exhaust opening disposed in the bottom of said fuselage and facing downwardly, a streamlined air duct connecting said frontal air duct to said lower exhaust opening, air-propelling means mounted in said frontal air duct for propelling air rearwardly to sustain a flow of air from said elongated openings downwardly over the sides of said fuselage and also downwardly from said lower opening, and adjustable air-deflecting means mounted in said openings.

2. A heavier-than-air aircraft having a streamlined elongated fuselage and an external air-flow system, said aircraft adapted to fly with the longitudinal axis of said fuselage being horizontal, said fuselage in lateral cross section having a relatively broad upper portion and downwardly streamlined sides that gradually curve inwardly to a lower apex, said air-flow system including a streamlined fore air duct surrounding the fore part of said fuselage and extending forward to form a forwardly facing intake opening, an upper branch of said air-flow system communicating with said fore air duct, said upper branch being contiguous with the upper portion of said fuselage and extending fore to aft for directing air flow rearwardly along said upper portion, said upper branch in lateral cross section being symmetrical with respect to said streamlined sides, each side of said upper branch having a side exhaust opening extending substantially the full length of said fuselage, said side exhaust openings facing downwardly adjacent said streamlined sides for directing a flow of air downwardly thereover, a lower branch of said air-flow system communicating with said fore air duct, said lower branch having an elongated lower exhaust opening disposed in the apex of said fuselage, said lower exhaust opening facing downwardly to direct flow of air downwardly from said lower branch and thereby to aid in maintaining a stream of air downwardly over said streamlined sides, air-propelling means mounted in said fore air duct for propelling air from said exhaust openings, and controllable air-deflecting means mounted in said exhaust openings.

References Cited in the file of this patent

UNITED STATES PATENTS

| | | |
|---|---|---|
| 1,956,054 | Wagner | Apr. 24, 1934 |
| 2,444,318 | Warner | June 29, 1948 |
| 2,567,392 | Naught | Sept. 11, 1951 |

FOREIGN PATENTS

| | | |
|---|---|---|
| 302,630 | Great Britain | Dec. 17, 1928 |